United States Patent
Wang

(10) Patent No.: US 8,590,343 B2
(45) Date of Patent: Nov. 26, 2013

(54) VACUUM INSULATING GLASS UNIT INCLUDING INFRARED MELTABLE GLASS FRIT, AND/OR METHOD OF MAKING THE SAME

(75) Inventor: Yei-Ping (Mimi) H. Wang, Troy, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 13/531,742

(22) Filed: Jun. 25, 2012

(65) Prior Publication Data

US 2012/0324953 A1 Dec. 27, 2012

Related U.S. Application Data

(62) Division of application No. 12/453,221, filed on May 1, 2009, now Pat. No. 8,227,055.

(51) Int. Cl.
C03B 23/24 (2006.01)

(52) U.S. Cl.
USPC .................................. 65/33.6; 65/42; 65/36

(58) Field of Classification Search
USPC ............................. 65/33.6, 36, 42
See application file for complete search history.

(56) References Cited

U.S. PATENT DOCUMENTS

| | | |
|---|---|---|
| 3,632,324 A | 1/1972 | Sasaki et al. |
| 4,088,522 A | 5/1978 | Mercier et al. |
| 4,683,154 A | 7/1987 | Benson et al. |
| 4,820,365 A | 4/1989 | Brumm et al. |
| 5,657,607 A | 8/1997 | Collins et al. |
| 5,664,395 A | 9/1997 | Collins et al. |
| 5,902,652 A | 5/1999 | Collins et al. |
| 6,365,242 B1 | 4/2002 | Veerasamy |
| 6,383,580 B1 | 5/2002 | Aggas |
| 6,399,169 B1 | 6/2002 | Wang et al. |
| 6,444,281 B1 | 9/2002 | Wang et al. |
| 6,503,583 B2 | 1/2003 | Nalepka et al. |
| 6,541,083 B1 | 4/2003 | Landa et al. |
| 6,635,321 B2 | 10/2003 | Wang et al. |
| 6,641,689 B1 | 11/2003 | Aggas |
| 6,692,600 B2 | 2/2004 | Veerasamy et al. |

(Continued)

FOREIGN PATENT DOCUMENTS

| | | |
|---|---|---|
| AU | 60 657 | 1/1967 |
| DE | 195 45 422 | 6/1997 |

(Continued)

OTHER PUBLICATIONS

Derwent abstract to KR-2005039451, Son M. et al., Production of low melting and transparent frit glass, Apr. 29, 2005.*

(Continued)

Primary Examiner — Queenie Dehghan
(74) Attorney, Agent, or Firm — Nixon & Vanderhye P.C.

(57) ABSTRACT

A method of making a vacuum insulating glass (VIG) unit. The method includes providing first and second substantially parallel spaced-apart glass substrates, a glass frit being provided at least partially between the first and second glass substrates for sealing said one or more edge portions to be sealed; and irradiating infrared energy towards the one or more edge portions to be sealed in forming an edge seal. The glass frit has a glass redox ($FeO/Fe_2O_3$) that is higher than a glass redox ($FeO/Fe_2O_3$) of the first and second substrates.

14 Claims, 4 Drawing Sheets

(56) References Cited

U.S. PATENT DOCUMENTS

| | | |
|---|---|---|
| 6,701,749 B2 | 3/2004 | Wang et al. |
| 6,926,782 B2 | 8/2005 | McGlinchy |
| 6,946,171 B1 | 9/2005 | Aggas |
| 7,244,480 B2 | 7/2007 | Minaai et al. |
| 8,227,055 B2 | 7/2012 | Wang |
| 2004/0180218 A1 | 9/2004 | Nagashima et al. |
| 2005/0116245 A1 | 6/2005 | Aitken et al. |
| 2006/0042748 A1 | 3/2006 | Hasegawa et al. |
| 2008/0214380 A1 | 9/2008 | Abensour et al. |

FOREIGN PATENT DOCUMENTS

| | | |
|---|---|---|
| EP | 0 061 183 | 9/1982 |
| EP | 1 216 971 | 6/2002 |
| EP | 1 571 134 | 9/2005 |
| EP | 2 017 236 | 1/2009 |
| JP | 2002-137939 | 5/2002 |
| RU | 1791433 | 1/1993 |
| SU | 852811 | 8/1981 |
| SU | 1590472 | 9/1990 |
| SU | 1694561 | 11/1991 |
| WO | WO 96/02473 | 2/1996 |
| WO | WO 02/14640 | 2/2002 |
| WO | WO 02/27135 | 4/2002 |
| WO | WO 2006/044383 | 4/2006 |

OTHER PUBLICATIONS

U.S. Appl. No. 12/453,221, filed May 1, 2009; Wang.
U.S. Appl. No. 13/137,660, filed Sep. 1, 2011; Wang.
International Search Report dated Mar. 18, 2009.
International Search Report dated Apr. 9, 2009.
International Search Report dated Jul. 8, 2010.
U.S. Appl. No. 12/000,663, filed Dec. 14, 2007; Cooper.
U.S. Appl. No. 12/000,791, filed Dec. 17, 2007, Wang et al.

* cited by examiner

VACUUM INSULATING GLASS UNIT INCLUDING INFRARED MELTABLE GLASS FRIT, AND/OR METHOD OF MAKING THE SAME

This application is a divisional of application Ser. No. 12/453,221 filed May 1, 2009, now U.S. Pat. No. 8,227,055, the entire disclosure of which is hereby incorporated herein by reference in this application.

FIELD OF THE INVENTION

Certain example embodiments of this invention relate to edge sealing techniques for vacuum insulating glass (VIG) units. More particularly, certain example embodiments of this invention relate to increasing the amount of ferrous oxide in glass frits (e.g., lead-free glass frits) used to form edge seals such that the glass frits absorb an increased amount of infrared radiation. Advantageously, the techniques of certain example embodiments enable the edge sealing process to be shortened from hours to minutes. The techniques of certain example embodiments additionally make it possible to expose some or all of the VIG intermediate assembly to the infrared source(s), since the glass frit will heat up faster than the substrates thereby reducing the likelihood of the first and/or second substrate melting and losing heat treatment (HT) strength (e.g., temper strength). In certain example embodiments, the frit's glass redox ($FeO/Fe_2O_3$) preferably is at least about 0.02 higher than either (or the higher) of the substrates' glass redox ($FeO/Fe_2O_3$), more preferably at least about 0.04 higher than either (or the higher) of the substrates' glass redox ($FeO/Fe_2O_3$), and most preferably at least about 0.06 higher than either (or the higher) of the substrates' glass redox ($FeO/Fe_2O_3$).

BACKGROUND AND SUMMARY OF EXAMPLE EMBODIMENTS OF THE INVENTION

Vacuum IG units are known in the art. For example, see U.S. Pat. Nos. 5,664,395, 5,657,607, and 5,902,652, the disclosures of which are all hereby incorporated herein by reference.

FIGS. 1-2 illustrate a conventional vacuum IG unit (vacuum IG unit or VIG unit). Vacuum IG unit 1 includes two spaced apart glass substrates 2 and 3, which enclose an evacuated or low pressure space 6 therebetween. Glass sheets/substrates 2 and 3 are interconnected by peripheral or edge seal of fused solder glass 4 and an array of support pillars or spacers 5.

Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between substrates 2 and 3 can be evacuated to create a low pressure area or space 6. After evacuation, tube 8 is melted to seal the vacuum. Recess 11 retains sealed tube 8. Optionally, a chemical getter 12 may be included within recess 13.

Conventional vacuum IG units, with their fused solder glass peripheral seals 4, have been manufactured as follows. Glass frit in a solution (ultimately to form solder glass edge seal 4) is initially deposited around the periphery of substrate 2. The other substrate 3 is brought down over top of substrate 2 so as to sandwich spacers 5 and the glass frit/solution therebetween. The entire assembly including sheets 2, 3, the spacers, and the seal material is then heated to a temperature of approximately 500° C., at which point the glass frit melts, wets the surfaces of the glass sheets 2, 3, and ultimately forms hermetic peripheral or edge seal 4. This approximately 500° C. temperature is maintained for from about one to eight hours. After formation of the peripheral/edge seal 4 and the seal around tube 8, the assembly is cooled to room temperature. It is noted that column 2 of U.S. Pat. No. 5,664,395 states that a conventional vacuum IG processing temperature is approximately 500° C. for one hour. Inventor Collins of the '395 patent states in "Thermal Outgassing of Vacuum Glazing," by Lenzen, Turner and Collins, that "the edge seal process is currently quite slow: typically the temperature of the sample is increased at 200° C. per hour, and held for one hour at a constant value ranging from 430° C. and 530° C. depending on the solder glass composition." After formation of edge seal 4, a vacuum is drawn via the tube to form low pressure space 6.

Unfortunately, the aforesaid high temperatures and long heating times of the entire assembly utilized in the formulation of edge seal 4 are undesirable, especially when it is desired to use a heat strengthened or tempered glass substrate(s) 2, 3 in the vacuum IG unit. As shown in FIGS. 3-4, tempered glass loses temper strength upon exposure to high temperatures as a function of heating time. Moreover, such high processing temperatures may adversely affect certain low-E coating(s) that may be applied to one or both of the glass substrates in certain instances.

FIG. 3 is a graph illustrating how fully thermally tempered plate glass loses original temper upon exposure to different temperatures for different periods of time, where the original center tension stress is 3,200 MU per inch. The x-axis in FIG. 3 is exponentially representative of time in hours (from 1 to 1,000 hours), while the y-axis is indicative of the percentage of original temper strength remaining after heat exposure. FIG. 4 is a graph similar to FIG. 3, except that the x-axis in FIG. 4 extends from zero to one hour exponentially.

Seven different curves are illustrated in FIG. 3, each indicative of a different temperature exposure in degrees Fahrenheit (° F.). The different curves/lines are 400° F. (across the top of the FIG. 3 graph), 500° F., 600° F., 700° F., 800° F., 900° F., and 950° F. (the bottom curve of the FIG. 3 graph). A temperature of 900° F. is equivalent to approximately 482° C., which is within the range utilized for forming the aforesaid conventional solder glass peripheral seal 4 in FIGS. 1-2. Thus, attention is drawn to the 900° F. curve in FIG. 3, labeled by reference number 18. As shown, only 20% of the original temper strength remains after one hour at this temperature (900° F. or 482° C.). Such a significant loss (i.e., 80% loss) of temper strength is of course undesirable.

In FIGS. 3-4, it is noted that much better temper strength remains in a thermally tempered sheet when it is heated to a temperature of 800° F. (about 428° C.) for one hour as opposed to 900° F. for one hour. Such a glass sheet retains about 70% of its original temper strength after one hour at 800° F., which is significantly better than the less than 20% when at 900° F. for the same period of time.

Another advantage associated with not heating up the entire unit for too long is that lower temperature pillar materials may then be used. This may or may not be desirable in some instances.

Even when non-tempered glass substrates are used, the high temperatures applied to the entire VIG assembly may melt the glass or introduce stresses. These stresses may increase the likelihood of deformation of the glass and/or breakage.

Lead-free frits sometimes are used when forming edge seals. Although lead-free fits are advantageous for a number of reasons (e.g., from environmental perspectives), the use of lead-free frits as edge seals for VIG units sometime is troublesome. For example, it is believed that all commercially available lead-free frits currently melt at temperatures in the range of 500 degrees C. to 600 degrees C. As is known, these temperatures are close to the softening point of soda lime glass, which may be used as the glass substrates in the VIG unit. Thus, it will be appreciated that the current process of melting lead-free frits typically disadvantageously softens the substrates that ultimately comprise the VIG unit. Additionally, exposing the substrates to such high temperatures typically causes them to lose at least some of the strength provided during heat treatment (HT). For example, tempered soda lime glass substrates sometimes actually may de-temper at these temperatures. Furthermore, the VIG unit manufacturing process typically takes a long time, inasmuch as a long time is required to reach and then cool down from these high temperatures. Accordingly, conventional lead-free frits lead to the some or all of the same or similar problems noted above.

Thus, it will be appreciated that there is a need in the art for a vacuum IG unit, and corresponding method of making the same, where a structurally sound hermetic edge seal may be provided between opposing glass sheets. There also exists a need in the art for a vacuum IG unit including tempered glass sheets, wherein the peripheral seal is formed such that the glass sheets retain more of their original temper strength than with a conventional vacuum IG manufacturing technique where the entire unit is heated in order to form a solder glass edge seal. It also will be appreciated that improvements to the ways in which lead-free frits are made and/or incorporated into VIG units would be desirable.

One aspect of certain example embodiments relates to providing an increased amount of ferrous oxide in the frit as opposed to the glass substrates. Accordingly, one aspect of certain example embodiments relates to providing a fit that has a glass redox ($FeO/Fe_2O_3$) greater than the glass redox ($FeO/Fe_2O_3$) of the two substrates comprising the VIG unit. In certain example embodiments, the frit's glass redox ($FeO/Fe_2O_3$) preferably is at least about 0.02 higher than either (or the higher) of the substrates' glass redox ($FeO/Fe_2O_3$), more preferably at least about 0.04 higher than either (or the higher) of the substrates' glass redox ($FeO/Fe_2O_3$), and most preferably at least about 0.06 higher than either (or the higher) of the substrates' glass redox ($FeO/Fe_2O_3$). This addition advantageously causes more energy from an infrared source to be absorbed by the fit and less energy to be transmitted through the frit. In certain example embodiments, the glass frit may be heated using one or more infrared source(s), e.g., operating at IR wavelengths in the range of 0.9-1.2 microns, for example.

Another aspect of certain example embodiments relates to providing a glass frit for a VIG unit edge seal having a glass redox ($FeO/Fe_2O_3$) of preferably 0.20 to 0.30, more preferably 0.21 to 0.28, and most preferably 0.22 to 0.25. Total iron content (expressed herein as $Fe_2O_3$) preferably is 0.5% to 5%, more preferably 0.75% to 3%.

Still another aspect of certain example embodiments relates to reducing the time in which the glass fit melts. For example, certain example embodiments may involve the melting of the glass fit at a temperature of 450 degrees C. (or less) after about 10 minutes.

Yet another aspect of certain example embodiments relates to maintaining the heat treatment (HT) strength (e.g., tempering strength) of the substrates of the VIG unit. This may be accomplished in certain example embodiments by heating the glass frit to a higher temperature than the substrates, e.g., over the same or similar amount of time.

Certain example embodiments of this invention relate to a vacuum insulating glass (VIG) intermediate assembly. First and second substantially parallel spaced-apart glass substrates are provided. The first and second substrates each include one or more edge portions to be sealed. A glass frit is provided at least partially between the first and second glass substrates for sealing said one or more edge portions to be sealed. The glass frit has a glass redox ($FeO/Fe_2O_3$) that is higher than a glass redox ($FeO/Fe_2O_3$) of the first and second substrates.

Certain example embodiments of this invention relate to a glass frit for a vacuum insulating glass (VIG) unit. The glass fit has a glass redox ($FeO/Fe_2O_3$) of 0.20 to 0.30 and a total iron content (expressed in terms of $Fe_2O_3$) of 0.5% to 5%. The glass frit absorbs infrared energy having a wavelength of 0.9-1.2 microns such that less than 15% of the infrared energy is transmitted through the glass frit. The glass frit absorbs infrared energy such that it reaches a melting temperature in 10 minutes or less. The glass frit melts after exposure to a temperature of 400-450 degrees C.

Certain example embodiments of this invention relate to a method of making a vacuum insulating glass (VIG) unit. First and second substantially parallel spaced-apart glass substrates are provided, with the first and second substrates each including one or more edge portions to be sealed, a glass frit is provided at least partially between the first and second glass substrates for sealing the one or more edge portions to be sealed. Infrared energy is irradiated from one or more infrared energy sources towards the one or more edge portions to be sealed in forming an edge seal of the VIG unit. The glass frit has a glass redox ($FeO/Fe_2O_3$) that is higher than a glass redox ($FeO/Fe_2O_3$) of the first and second substrates.

Certain example embodiments of this invention relate to a method of making a vacuum insulating glass (VIG) unit. First and second substantially parallel spaced-apart heat treated (HT) glass substrates are provided, with the first and second substrates each including one or more edge portions to be sealed. A glass frit is provided at least partially between the first and second glass substrates for sealing the one or more edge portions to be sealed. Infrared energy is irradiated from one or more infrared energy sources towards the one or more edge portions to be sealed in forming an edge seal of the VIG unit. The glass frit includes an increased amount of ferrous oxide such that the irradiating of the infrared energy causes the first and/or second substrate to reach a first elevated temperature and the glass frit to reach a second elevated temperature, with the second elevated temperature being higher than the first elevated temperature and with the first elevated temperature being sufficiently low to reduce the likelihood of the first and/or second substrate melting and losing HT strength.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 2:
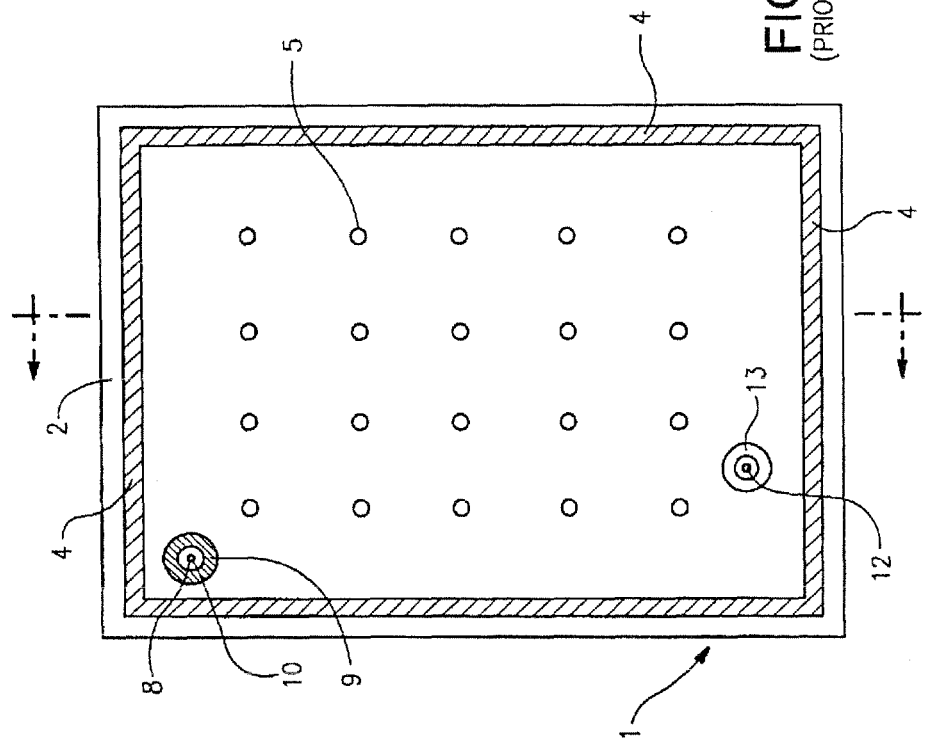
FIG. 2 is a prior art top plan view of the bottom substrate, edge seal, and spacers of the FIG. 1 vacuum IG unit taken along the section line illustrated in FIG. 1.
Figure 1:
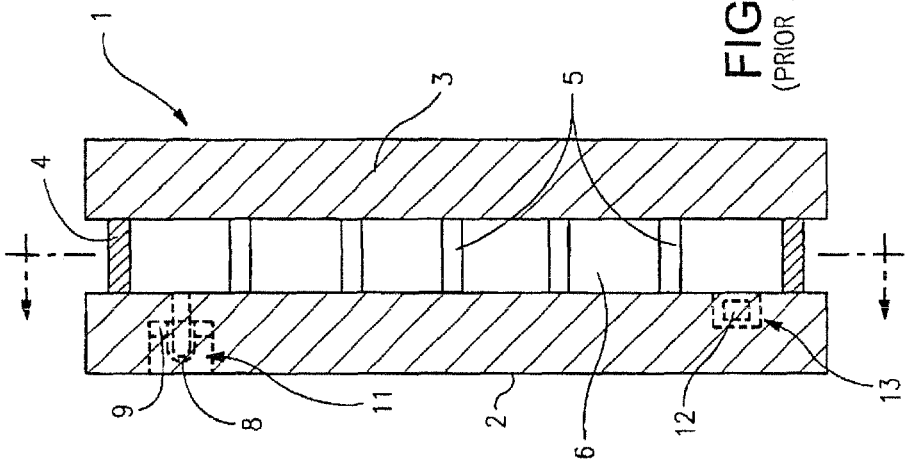
FIG. 1 is a prior art cross-sectional view of a conventional vacuum IG unit.
Figure 3:
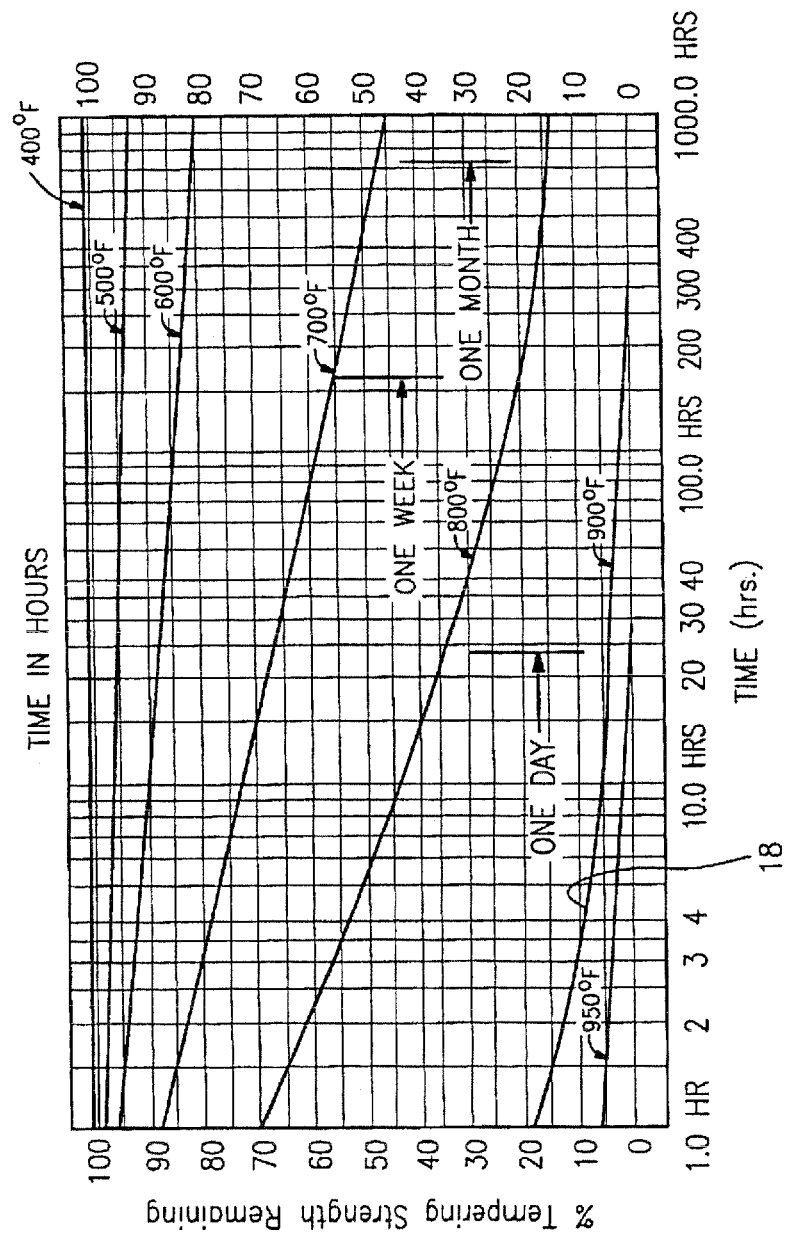
FIG. 3 is a graph correlating time (hours) versus percent tempering strength remaining, illustrating the loss of original temper strength for a thermally tempered sheet of glass after exposure to different temperatures for different periods of time.
Figure 4:
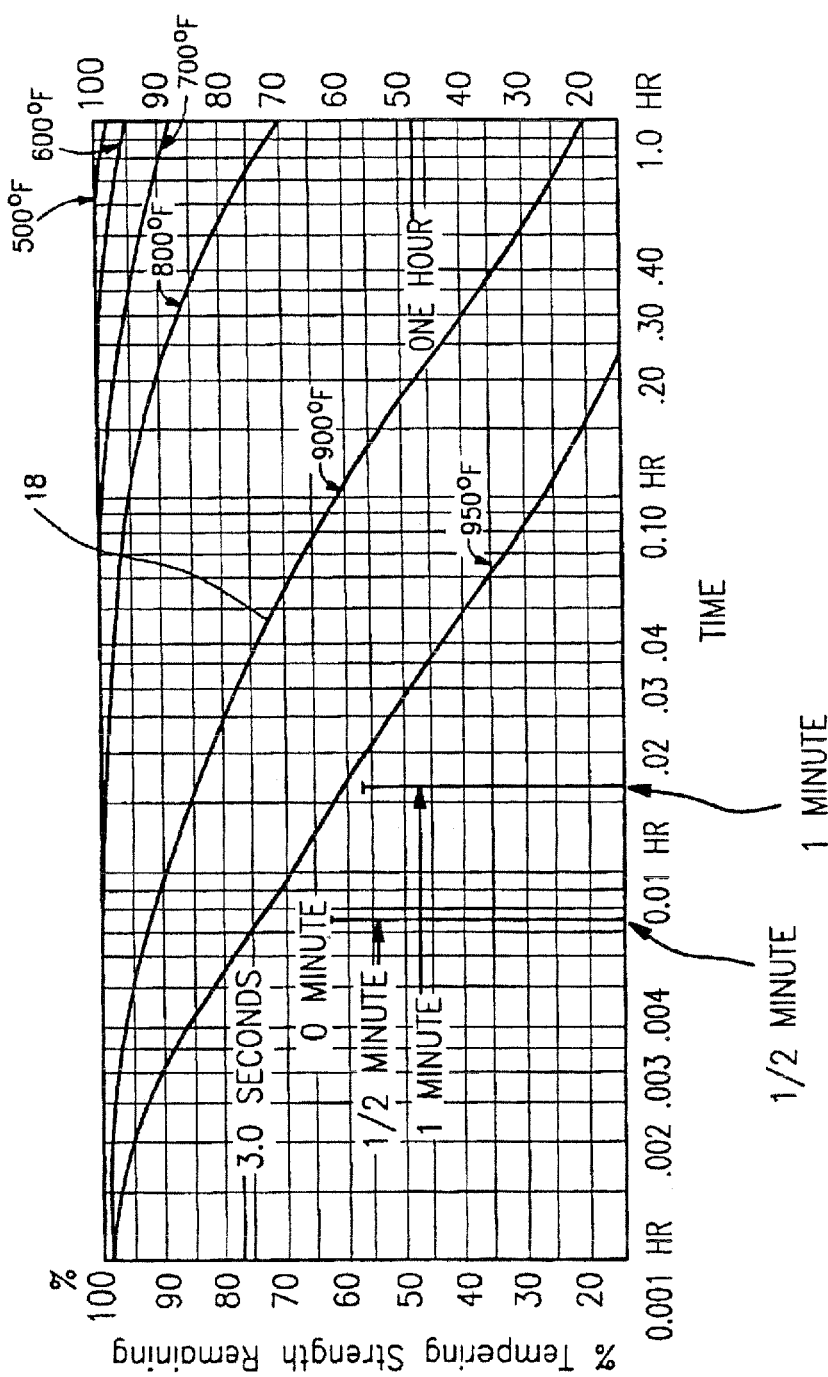
FIG. 4 is a graph correlating time versus percent tempering strength remaining similar to that of FIG. 3, except that a smaller time period is provided on the x-axis.

Certain embodiments of this invention relate to an improved peripheral or edge seal in a vacuum IG window unit, and/or a method of making the same. "Peripheral" and "edge" seals herein do not mean that the seals are located at the absolute periphery or edge of the unit, but instead mean that the seal is at least partially located at or near (e.g., within about two inches) an edge of at least one substrate of the unit. Likewise, "edge" as used herein is not limited to the absolute edge of a glass substrate but also may include an area at or near (e.g., within about two inches) of an absolute edge of the substrate(s). Also, it will be appreciated that as used herein the term "VIG assembly" refers to an intermediate product prior to the VIG's edges being sealed and evacuation of the recess including, for example, two parallel-spaced apart substrates and a frit. Also, while the frit may be said to be "on" or "supported" by one or more of the substrates herein, this does not mean that the frit must directly contact the substrate(s). In other words, the word "on" covers both directly and indirectly on, so that the frit may be considered "on" a substrate even if other material (e.g., a coating and/or thin film) is provided between the substrate and the frit.

Certain example embodiments of this invention advantageously shorten the process time involved in certain aspects of the forming of an edge seal from hours to minutes. Certain example embodiments of this invention also advantageously allow the substrates in the final VIG product to maintain more of their HT strength (e.g., temper strength), while also simplifying manufacturing setup.

Certain example embodiments involve adding iron oxide to current glass frit formulations. This enables the frit to increase the absorption of infrared energy (e.g., energy in the range of, for example, 0.9-1.2 microns) irradiated at or proximate to the glass frit in the edge sealing process. More particularly, the inventor of the instant invention has realized that adjusting the ratio of ferrous oxide to total iron oxide will provide certain example advantages to the VIG unit manufacturing process.

The total amount of iron present in the glass and in the colorant portion thereof is expressed herein in terms of $Fe_2O_3$ in accordance with standard practice. This, however, does not imply that all iron is actually in the form of $Fe_2O_3$. Likewise, the amount of iron in the ferrous state is reported herein as FeO, even though all ferrous state iron in the glass may not be in the form of FeO. The proportion of the total iron in the ferrous state (i.e., FeO) is used to determine the redox state of the glass (i.e., glass redox). Herein, glass redox is expressed as the ratio $FeO/Fe_2O_3$, which is the weight percentage (%) of iron in the ferrous state (expressed as FeO) divided by the weight percentage (%) of total iron (expressed as $Fe_2O_3$). Thus, $Fe_2O_3$ herein means total iron and FeO means iron in the ferrous state. Iron in the ferrous state ($Fe^{2+}$; FeO) is a blue-green colorant, while iron in the ferric state ($Fe^{3+}$) is a yellow-green colorant.

The glass redox is defined above. However, batch redox is different from glass redox. Batch redox is known in the art as being generally based on the following. Each component of the batch is assigned a redox number, and the batch redox is calculated as the sum total of the same. The calculations are based on the amount of a component per 2,000 kg of sand. The batch redox number is calculated before the glass is made (i.e., from the batch). A detailed discussed of how "batch redox" is determined is provided in The redox number concept and its use by the glass technologist, W. Simpson and D. D. Myers (1977 or 1978), the entire disclosure of which is hereby incorporated herein by reference. In contrast, as explained above, the glass redox is calculated after the glass has been made from spectral data, and is a ratio of % FeO (e.g., from a spectrum) to total iron in the glass (e.g., from chemical analysis).

The following table includes the transmission at 1000 nm for total iron content (wt. of $Fe_2O_3$ to total glass wt.) for the glass frits of certain example embodiments. Similarly, FIG. 5 plots transmission at 1000 nm versus total iron content.

| Total Iron Content (wt. of $Fe_2O_3$ to total glass wt.) | $T_{1000}$ (% T at 1000 nm) |
|---|---|
| 0.01% | 90 |
| 0.10% | 78.76 |
| 0.50% | 34.23 |
| 1.30% | 15.33 |
| 1.90% | 4.87 |

Figure 5:
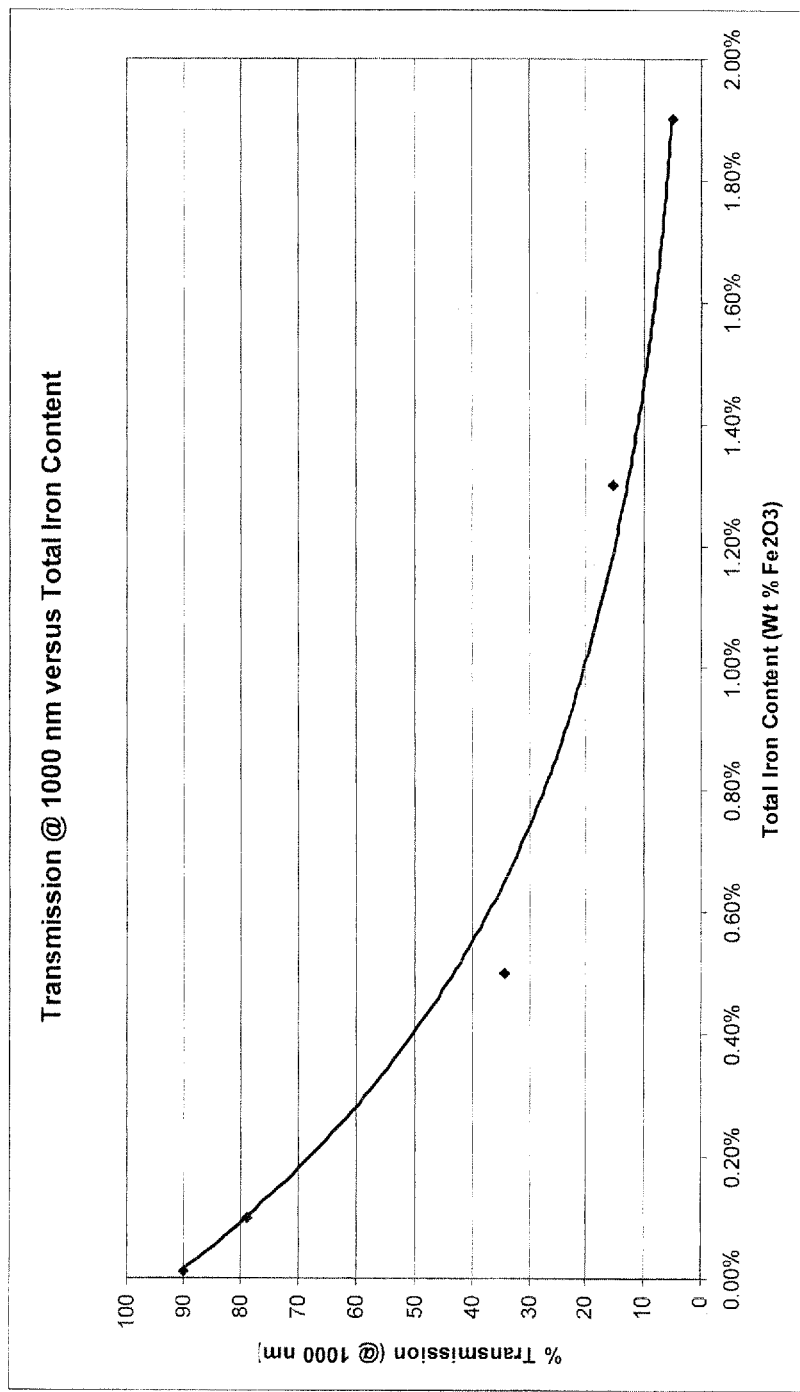
FIG. 5 is a graph that plots transmission at 1000 nm versus total iron content for a glass frit according to an example embodiment.

Based on the information included in the table above and in FIG. 5, the inventor of the instant invention has discovered that glass redox ($FeO/Fe_2O_3$) for the frit preferably is 0.20 to 0.30, more preferably 0.21 to 0.28, and most preferably 0.22 to 0.25. Furthermore, the inventor of the instant invention has discovered that the total iron content (expressed herein as $Fe_2O_3$) preferably is 0.5% to 5%, more preferably 0.75% to 3%. As indicated above, one aspect of certain example embodiments relates to providing a frit that has a glass redox ($FeO/Fe_2O_3$) greater than the glass redox ($FeO/Fe_2O_3$) of the two substrates comprising the VIG unit. Thus, where the above values correspond to the glass redox of the substrates (as opposed the glass redox of the frit), it will be appreciated that the glass redox of the frit may be increased to level(s) higher than the ranges indicated above. In certain example embodiments, the frit's glass redox ($FeO/Fe_2O_3$) preferably is at least about 0.02 higher than either (or the higher) of the substrates' glass redox ($FeO/Fe_2O_3$), more preferably at least about 0.04 higher than either (or the higher) of the substrates' glass redox ($FeO/Fe_2O_3$), and most preferably at least about 0.06 higher than either (or the higher) of the substrates' glass redox ($FeO/Fe_2O_3$).

Although a wavelength of 1000 nm is provided, it will be appreciated that infrared energy irradiated at or proximate to the glass frit in the edge sealing process may be in the range of, for example, 0.9-1.2 microns. By providing the glass redox within the above-noted or similar ranges, a reduced amount of infrared energy is transmitted through the glass frit of certain example embodiments. For example, preferably less than 35% of infrared energy is transmitted through the glass fit of certain example embodiments, more preferably less than 15%, still more preferably less than 10%, and most preferably less than 5%.

The glass fits of certain example embodiments lead to certain example advantages. For example, because the frit absorbs infrared energy (e.g., as specified above), the heat-up rate is much faster than conventional convection heating. Indeed, certain example embodiments the heating process may be shortened from hours (for conventional convection heating) to minutes. For example, certain example embodiments may achieve a glass frit temperature of 450 degrees C. in 10 minutes or less, with this temperature causing the frit to melt. It will be appreciated that this 450 degree C. temperature is less than the 500-600 degree C. temperatures used in conventional heating processes. Using the techniques of certain example embodiments, it may be possible to melt the frit at a temperature of 400-425 degrees C. over the same 10 minute or a similar time period. This may be accomplished by increasing the amount of ferrous oxide in the frit. Thus, it will be appreciated that, in certain example embodiments, the time in which the glass frit melts may be reduced.

By providing an increased amount of ferrous oxide in the frit as opposed to the glass substrates, it becomes possible in certain example embodiments to expose some or all of the entire intermediate assembly to the infrared energy source. This is because the increased amount of ferrous oxide in the frit will result in preferential heating, e.g., such that the glass fit is heated faster than the glass substrates. Thus, some or all of the glass substrates may be heated to a first elevated temperature whereas the glass frits may be heated to a second elevated temperature at substantially the same time, with the second elevated temperature being higher than the first elevated temperature. In contrast, conventional oven processes typical involve the glass substrates being heated to the same or very similar temperatures as the glass frit.

Accordingly, by shortening the heating time and lowering the temperature of the glass substrates, certain example embodiments may enable the glass substrates of the VIG units to maintain an increased amount of HT strength (e.g., tempering strength), even after the melting process. In certain example embodiments, at least 50% of the HT strength will be maintained, more preferably at least 65%, still more preferably at least about 70%, and most preferably at least about 75-80%.

The ability to expose the whole unit to the infrared source (s) in certain example embodiments advantageously makes the process setup simple.

As indicated above, it will be appreciated that the example embodiments described herein may be used in connection with lead-free frits. For example, iron oxide may be added to current glass frit formulations, e.g., such that the glass redox reaches the above-identified and/or similar ranges. Although certain example embodiments relate to "lead-free frits," it is understood that such frits are not necessarily completely free from lead. In other words, a frit may have some small amount of lead and still be considered "lead-free."

Certain example embodiments may provide localized heating to and/or IR heating of the frits as disclosed in, for example, application Ser. Nos. 12/000,663 and 12/000,791, the entire contents of each which are hereby incorporated herein by reference.

It will be appreciated that the example embodiments described herein may be used in connection with a variety of different VIG assembly and/or other units or components. For example, the substrates may be glass substrates, heat strengthened substrates, tempered substrates, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a vacuum insulating glass (VIG) unit, the method comprising:
   providing first and second substantially parallel spaced-apart glass substrates, the first and second substrates each including one or more edge portions to be sealed, a glass frit being provided at least partially between the first and second glass substrates for sealing said one or more edge portions to be sealed; and
   irradiating infrared energy from one or more infrared energy sources towards the one or more edge portions to be sealed in forming an edge seal of the VIG unit,
   wherein the glass frit has a glass redox ($FeO/Fe_2O_3$) that is higher than a glass redox ($FeO/Fe_2O_3$) of the first and second substrates.

2. The method of claim 1, wherein the glass frit absorbs infrared energy having a wavelength of 0.9-1.2 microns such that less than 15% of the infrared energy is transmitted through the glass frit.

3. The method of claim 1, wherein the glass frit absorbs infrared energy such that it reaches a melting temperature in 10 minutes or less.

4. The method of claim 1, wherein the glass frit melts after exposure to a temperature of 400-450 degrees C.

5. The method of claim 1, wherein the glass frit is a lead-free glass frit.

6. The method of claim 1, wherein only the edge portions to be sealed are exposed to infrared energy.

7. The method of claim 1, wherein the irradiating of the infrared energy causes the first and/or second substrate to reach a first elevated temperature and the glass frit to reach a second elevated temperature, the second elevated temperature being higher than the first elevated temperature.

8. The method of claim 7, wherein
   the first and second substrates are tempered, and
   post-infrared energy irradiation, the first and second substrates maintain at least about 65% of their respective temper strengths.

9. The method of claim 1, wherein the glass redox ($FeO/Fe_2O_3$) of the glass frit is at least 0.02 higher than the glass redox ($FeO/Fe_2O_3$) of the first and second substrates.

10. The method of claim 1, further comprising providing a plurality of spacers between the glass substrates.

11. The method of claim 10, further comprising causing a gap between the first and second substrates to be at a pressure less than atmospheric.

12. A method of making a vacuum insulating glass (VIG) unit, the method comprising:
   having first and second substantially parallel spaced-apart heat treated (HT) glass substrates, the first and second substrates each including one or more edge portions to be sealed;
   providing a glass frit at least partially between the first and second glass substrates for sealing said one or more edge portions to be sealed; and
   irradiating infrared energy at 0.9-1.2 microns from one or more infrared energy sources towards the one or more edge portions to be sealed in forming an edge seal of the VIG unit,
   wherein the glass frit includes an increased amount of ferrous oxide compared to the glass substrates such that the irradiating of the infrared energy causes the first and/or second substrate to reach a first elevated temperature and the glass frit to reach a second elevated temperature, the second elevated temperature being higher than the first elevated temperature and the first elevated temperature being sufficiently low to reduce the likelihood of the first and/or second substrate melting and losing HT strength, and causing a gap between the first and second substrates to be at a pressure less than atmospheric.

13. The method of claim 12, wherein the glass redox (FeO/Fe$_2$O$_3$) of the glass frit is at least 0.02 higher than the glass redox (FeO/Fe$_2$O$_3$) of the first and second substrates, and/or the glass frit absorbs infrared energy having such that less than 15% of the infrared energy is transmitted through the glass frit.

14. The method of claim 12, wherein the glass frit has a glass redox (FeO/Fe$_2$O$_3$) that is higher than a glass redox (FeO/Fe$_2$O$_3$) of the first and second glass substrates.

* * * * *